United States Patent
Argiro

Patent Number: 6,130,671
Date of Patent: Oct. 10, 2000

[54] VOLUME RENDERING LIGHTING USING DOT PRODUCT METHODOLOGY

[75] Inventor: Vincent J. Argiro, Fairfield, Iowa

[73] Assignee: Vital Images, Inc., Plymouth, Minn.

[21] Appl. No.: 08/978,984

[22] Filed: Nov. 26, 1997

[51] Int. Cl.[7] .................................................. G06T 17/00
[52] U.S. Cl. ........................................ 345/424; 345/426
[58] Field of Search ..................................... 345/424, 426

[56] References Cited

U.S. PATENT DOCUMENTS

| | | | |
|---|---|---|---|
| 4,835,712 | 5/1989 | Drebin et al. | 345/423 |
| 4,866,612 | 9/1989 | Takagi et al. | 345/429 |
| 5,283,837 | 2/1994 | Wood | 382/6 |
| 5,581,671 | 12/1996 | Goto et al. | 345/419 |
| 5,617,521 | 4/1997 | Goto | 345/426 |

FOREIGN PATENT DOCUMENTS 2614163   10/1988   France .

OTHER PUBLICATIONS

Neider, J., et al., "OpenGL Programming Guide: The Official Guide to Learning OpenGL", *Silicon Graphics Inc., Release 1/ OpenGL Architecture Review Board*, ISBN 0201632748, Including p. 191, (1993).

*Primary Examiner*—Mark P. Powell
*Assistant Examiner*—Motilewa Good-Johnson
*Attorney, Agent, or Firm*—Schwegman, Lundberg, Woessner & Kluth, P.A.

[57] ABSTRACT

Volume rendering lighting using dot product methodology is disclosed. In one embodiment of the invention, a computer includes a processor, a computer-readable medium and a computer program. The medium stores first data representing a set of voxel data representing an object, each voxel datum having a gradient that is desirably either positive or negative, and second data representing a light source having a directional vector. The computer program is executed by the processor from the medium, and displays the set of the voxel data, including illuminating each voxel datum using a dot product of the gradient of the voxel datum with the directional vector of the light source.

12 Claims, 6 Drawing Sheets

VOLUME RENDERING LIGHTING USING DOT PRODUCT METHODOLOGY

FIELD OF THE INVENTION

The present invention relates generally to the display of images that are three-dimensional volume renderings, and more particularly to lighting in the display of such images using dot product methodology.

BACKGROUND OF THE INVENTION

Because of the increasingly fast processing power of modern-day computers, users have turned to computers to assist them in the examination and analysis of images of real-world data. For example, within the medical community, radiologists and other professionals who once examined x-rays hung on a light screen now use computers to examine images obtained via ultrasound, computed tomography (CT), magnetic resonance (MR), ultrasonography, positron emission tomography (PET), single photon emission computed tomography (SPECT), magnetic source imaging, and other imaging techniques. Countless other imaging techniques will no doubt arise as medical imaging technology evolves.

Each of the above-identified imaging procedures generates volume images, although each relies on a different technology to do so. Thus, CT requires an x-ray source to rapidly rotate around a patient to obtain up to hundreds of electronically stored pictures of the patient. Conversely, for example, MR requires that radio-frequency waves be emitted to cause hydrogen atoms in the body's water to move and release energy, which is then detected and translated into an image. Because each of these techniques penetrates the body of a patient to obtain data, and because the body is three-dimensional, this data represents a three-dimensional image, or volume. In particular, CT and MR both provide three-dimensional "slices" of the body, which can later be electronically reassembled.

Computer graphics images, such as medical images, have typically been modeled through the use of techniques such as surface rendering and other geometric-based techniques. Because of known deficiencies of such techniques, researchers have turned to volume-rendering techniques as a more accurate way to render images based on real-world data. Volume-rendering takes a conceptually intuitive approach to rendering, by assuming that three-dimensional objects are composed of basic volumetric building blocks.

These volumetric building blocks are commonly referred to as voxels. Whereas, by contrast, the well known pixel is a picture element—i.e., a tiny two-dimensional sample of a digital image have a particular location in the plane of a picture defined by two coordinates—a voxel is a sample that exists within a three-dimensional grid, positioned at coordinates x, y, and z. The voxel has a "Voxel," as that value is obtained from real-world scientific or medical instruments. The voxel value may be measured in any of a number of different units, such as hounsefield units, which are well known to those of ordinary skill within the art.

Using volume-rendering, any three-dimensional volume can be simply divided into a set of three-dimensional samples, or voxels. Thus, a volume containing an object of interest is dividable into small cubes, each of which contain some piece of the original object. This continuous volume representation is transformable into discrete elements by assigning to each cube a voxel value that characterizes some quality of the object as contained in that cube.

The object is thus summarized by a set of point samples, such that each voxel is associated with a single digitized point in the data set. As compared to mapping boundaries in the case of geometric-based surface-rendering, reconstructing a volume using volume-rendering requires much less effort and is more intuitively and conceptually clear. The original object is reconstructed by the stacking of voxels together in order, so that they accurately represent the original volume.

Although more simple on a conceptual level, and more accurate in providing an image of the data, volume-rendering is nevertheless still complex. A key requisite of volume rendering is the use of the entire voxel data set to create an image. In one method of voxel rendering, called image ordering or ray casting, the volume is positioned behind the picture plane, and a ray is projected perpendicularly from each pixel in the picture plane through the volume behind the pixel. As each ray penetrates the volume, it accumulates the properties of the voxels it passes through and adds them to the corresponding pixel. The properties accumulate more quickly or more slowly depending on the transparency of the voxels.

In another method, called object-order (or compositing or splatting), the voxel values are also combined to produce image pixels for display on a computer screen. The image plane is positioned behind the volume, and each pixel is assigned an initial background value. A ray is projected perpendicularly from the image plane through the volume to the viewer. As the ray encounters each successive layer of voxels, the voxel values are blended into the background, forming the image according to each voxel's interpreted opacity. The image rendered in this method as well depends on the transparency of the voxels.

Typically in either method, lighting of the voxel data (i.e., providing for lighting values of the voxel data) is accomplished by conceptually placing a light source coincident with the viewer's perspective, such that each voxel is illuminated insofar as it reflects light back towards the light source (i.e., toward's the viewer's perspective). In most situations, this provides for adequate lighting. However, in some instances, voxel data representing features that have surfaces facing away from the light source are desirable to illuminate, but cannot be provided with lighting insofar as they do not reflect light back towards the light source.

For example, a blood vessel may have an outer wall facing the light source, and an inner wall on the other side of the outer wall that does not face the light source. This inner wall may be desirable to light for clinical diagnosis, but cannot be by the method just described. A light source directed towards the outer wall, that is, provides for illumination of the outer wall because the surface of the outer wall points back to the light source; however, the light source does not provide for lighting of the inner wall because the surface of the inner wall points away from the light source. This is disadvantageous in those situations where lighting both walls is desirable for proper clinical diagnosis, however, and represents an existing shortcoming in current volume-rendering technology.

SUMMARY OF THE INVENTION

The above-identified shortcomings, problems, and disadvantages found in the prior art, as well as other shortcomings, problems, and disadvantages, are addressed by the present invention. The invention relates to the lighting of volume-rendered images by using a dot product methodology. A volume-rendered image includes a set of voxel data that represents an object. Each voxel datum within the set of voxel data may have a gradient associated with it representing the direction of the surface of the voxel datum. Furthermore, a light source is defined as having a vector representing the direction in which light emits from the source. Thus, a positive gradient may mean that the surface points in the same direction as does the light source (assuming the light source has a positive vector), while a negative gradient may mean that the surface points in the opposite does as does the light source (again assuming that the light source has a positive vector).

In one embodiment of the invention, a computer includes a processor, a computer-readable medium and a computer program. The medium stores first data representing the set of voxel data, each voxel datum having a gradient that is desirably either positive or negative, and second data representing the light source having the directional vector. The computer program is executed by the processor from the medium, and displays the set of the voxel data, including lighting each voxel datum using a dot product of the gradient of the voxel datum with the directional vector of the light source. (It is noted that for purposes this application, taking the dot product of the gradient and the directional vector means more specifically taking the dot product of the vector of the gradient—i.e., the gradient vector—and the directional vector.)

The invention thus illuminates surfaces of the object regardless of whether the surface points towards or away from the light source, overcoming disadvantages found in the prior art. For example, voxel data having positive gradients where the light source has a positive directional vector would not be lighted within the prior art, because the surface points away from the light source such that light would not be reflected back towards the light source. However, under the invention, a dot product of the gradient and the directional vector (more specifically, the absolute value of the dot product) would yield a non-zero lighting value, such that this voxel data would be illuminated. (Note that the only voxel data not lighted by the inventive approach is that which have gradients at a right angle to the lighting source, such that the absolute dot product would be zero.)

In varying embodiments of the invention, computerized system, computerized methods, and computers are disclosed. Still other and further aspects, advantages and embodiments of the invention will become apparent by reading the following specification, and by reference to the drawings.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

The detailed description is divided into four sections. In the first section, a description of a typical computer in conjunction with which embodiments of the invention may be implemented is provided. In the second section, an overview of the invention is provided. In the third section, a description of a computerized method in accordance with one embodiment of the invention is given. Finally, in the fourth section, a conclusion is presented.

Computer

Figure 1:
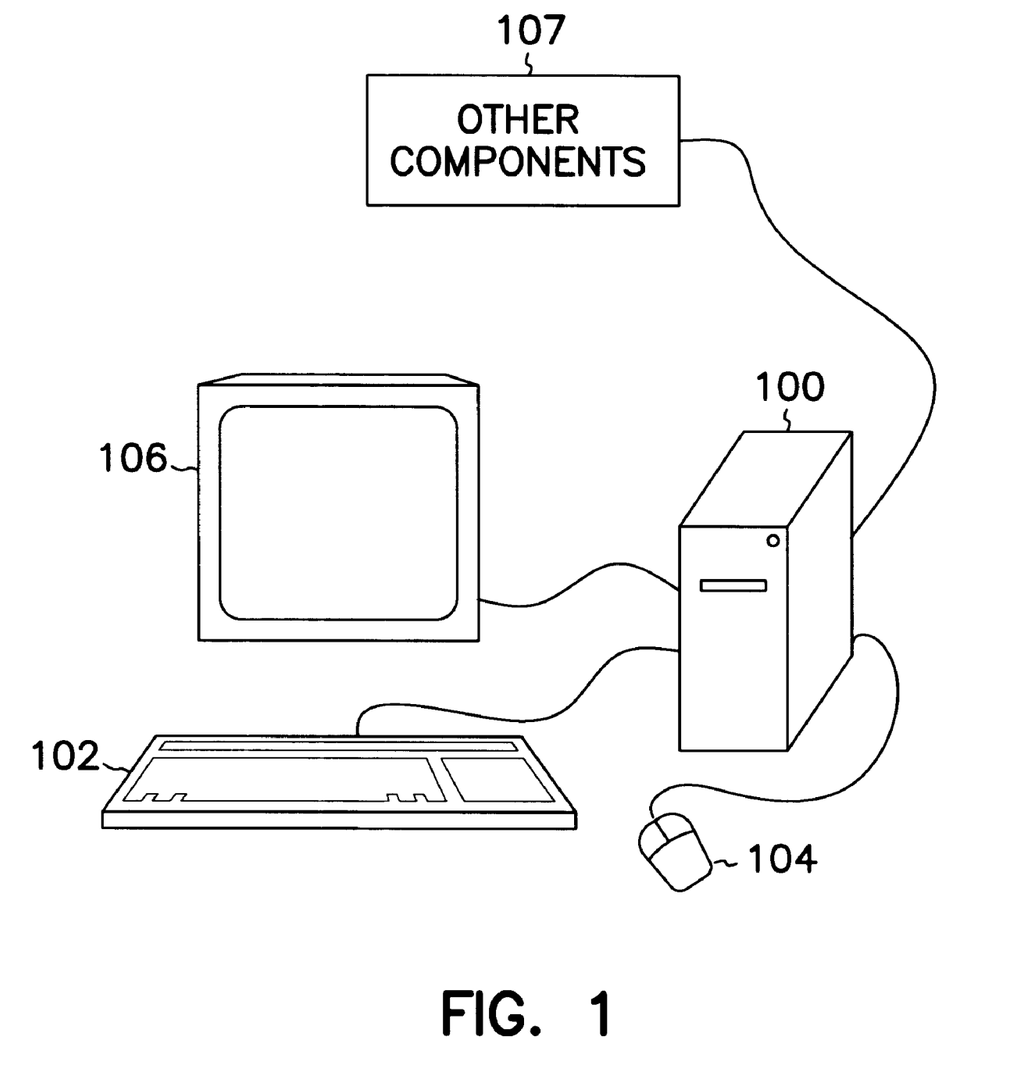
FIG. 1 is a diagram of a typical computer in conjunction with which embodiments of the invention may be implemented.

In this section of the detailed description, a description of a typical computer in conjunction with which embodiments of the invention may be implemented is provided. Referring to FIG. 1, the hardware shown includes computer 100, keyboard 102, pointing device 104, display device 106, and other components 107 (represented by a block diagram). Computer 100 is in one embodiment UNIX compatible. More particularly, computer 100 in one embodiment is a Silicon Graphics, Inc. (SGI) workstation running in an OSF/Motif window environment, with a graphical user interface. Such SGI workstations include the SGI O2, which in one embodiment runs the SGI Irix 6.3 operating system, in which case the embodiment is based on the OpenGL graphics library, and uses the Viewkit class library. The invention is not limited, however, to any particular computer 100.

As shown in FIG. 1, pointing device 104 is a mouse, although the invention is not limited to any particular pointing device. For example, pointing device 104 may also be a point stick, trackball, or a touch pad. The pointing device typically has three buttons, although no embodiment of the invention is so particularly limited. As described herein, clicking, selecting, pressing, or holding, etc., of a pointing device button (such as a mouse button) refers to the clicking, selecting, pressing, or holding, etc., of the left button if there is more than one button on the pointing device.

In one embodiment of the invention, an additional pointing device (viz., part of other components 107 as shown in FIG. 1) is also coupled to computer 100. This additional pointing device is a three-dimensional controller, which allows a user of the invention easy control of the fly through feature of embodiments of the invention. One such pointing device is the Spacetec IMC SpaceBall 3003. Display device 106 can be any of a number of different devices, but in one embodiment of the invention is a computer monitor having a cathode ray tube (CRT). In the embodiment of the invention where computer 100 is an SGI workstation, display device 106 is a twenty-one inch monitor capable of displaying twenty-four-bit color graphics, and having a resolution of 1280×1024 pixels. Furthermore, other components 107 may in varying embodiments of the invention include a video cassette recorder, or a printer. Computer 100 may also have the capability of hooking up to a network (such as a DICOM network), may having Internet or intranet capability, or have access to a DICOM server. Each of these is well known to those skilled in the art.

Not shown in FIG. 1 is that computer 100 typically includes a central-processing unit (CPU), a random-access memory (RAM), and a read-only memory (ROM). The CPU, RAM, and ROM may be of any type; no embodiment of the invention is particularly limited. In the embodiment of the invention where computer 100 is an SGI workstation, the CPU is a MIPS R10000 or an R5000, and there are typically one-hundred-twenty-eight megabytes of RAM. Also not shown in FIG. 1 is that computer 100 also usually comprises a fixed storage device such as a hard disk drive, and a removable storage device such as a tape cartridge drive or floppy disk drive. Conversely, such components may be external components to computer 100, in which case they are a part of other components 107. The tape cartridge drive in one embodiment is compatible with a General Electric Genesis tape archive format. The memory (e.g., RAM and ROM) and the storage devices (e.g., hard drives, floppy disks, tapes, etc.), are types of computer-readable media.

The invention provides an environment in which volume data comprised of voxels is displayed. No embodiment of the invention is limited as to the programming language by which the software aspect providing this environment is implemented. However, in one embodiment, the language is the object-oriented programming language C++. Furthermore, no embodiment of the invention is limited as to what the volume data comprised of voxels represents. In one embodiment of the invention, the volume data (voxel data) represents medical images of various parts of the human body, as scanned in from a medical imaging device. One embodiment of the invention specifically relates to the viewing of volume-related medical images; however, it should be understood to and appreciated by those of ordinary skill within the art that no embodiment of the invention is so limited.

Overview of the Invention

In this section of the detailed description, an overview of an exemplary embodiment of the invention is described. As has been stated, a volume-rendered image includes a set of voxel data—that is, a set of individual voxel datums or "voxels." Each voxel has a voxel value, such that the set of voxel data has a range of voxel values, spanning from the lowest voxel value for any voxel within the set, to the highest voxel value for any voxel within the set.

Furthermore, each voxel has a gradient associated with it. The gradient represents the direction in which the surface of the voxel. For sake of simplicity, it is assumed here that a positive gradient means that the voxel's surface direction is coincident with the direction of an imaginary light source placed in front of the image—that is, that the voxel's surface direction is the same as a directional vector of the light source—and a negative gradient means that the voxel's surface direction is opposite to the direction of the light source. The imaginary light source is used in conjunction with the gradient of the surface of a voxel to derive a lighting value for the voxel, which dictates the illumination of that voxel. Desirably, the light source is coincident with a viewer of the voxel data.

Figure 2A:
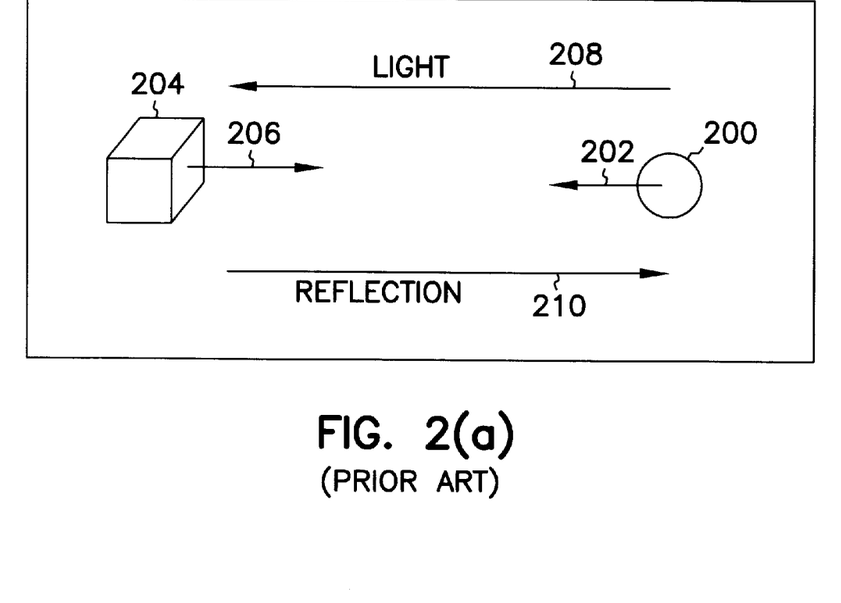
FIGS. 2(a), 2(b) and 2(c) are diagrams showing the manner by which a voxel is lighted in accordance with the prior art.
Figure 2B:
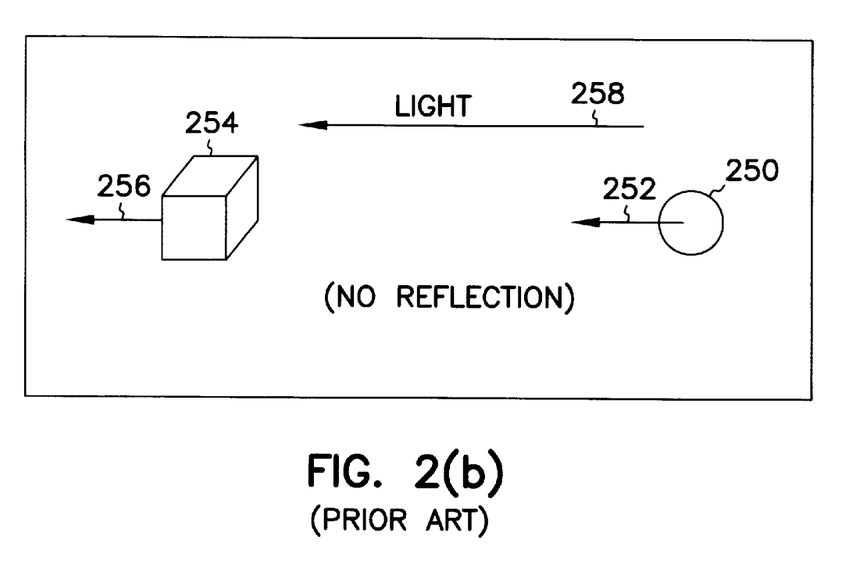

FIGS. 2(a) and 2(b) show the manner by which a lighting value is obtained for a voxel in accordance with the prior art. Specifically, FIG. 2(a) shows the situation in which a voxel has a surface having a direction pointing towards the light source, such that the voxel is illuminated. Light source 200 has directional vector 202, which is defined as positive. Voxel 204 has gradient 206 pointing in the opposite direction to vector 202, and thus is negative. Voxel 204 is provided with a non-zero lighting value because light emitted by light source 200, as represented by arrow 208, is reflected by voxel 204 back towards the light source, as represented by arrow 208.

Conversely, FIG. 2(b) shows the situation in which a voxel has a surface having a direction pointing away form the light source, such that the voxel is not illuminated. Light source 250 has directional vector 252, which is defined as positive. Voxel 254 has gradient 256 pointing in the same direction as vector 252, and thus is also positive. Voxel 254 is provided with a zero lighting value because light emitted by light source 250, as represented by arrow 258, is not reflected by voxel 254; the gradient of voxel 254 is not in an opposite direction to that of the directional vector of light source 250. Therefore, as shown in FIG. 2(b), a disadvantage with the prior art is that voxels having gradients pointing away from the light source are not provided with lighting values.

Figure 2C:
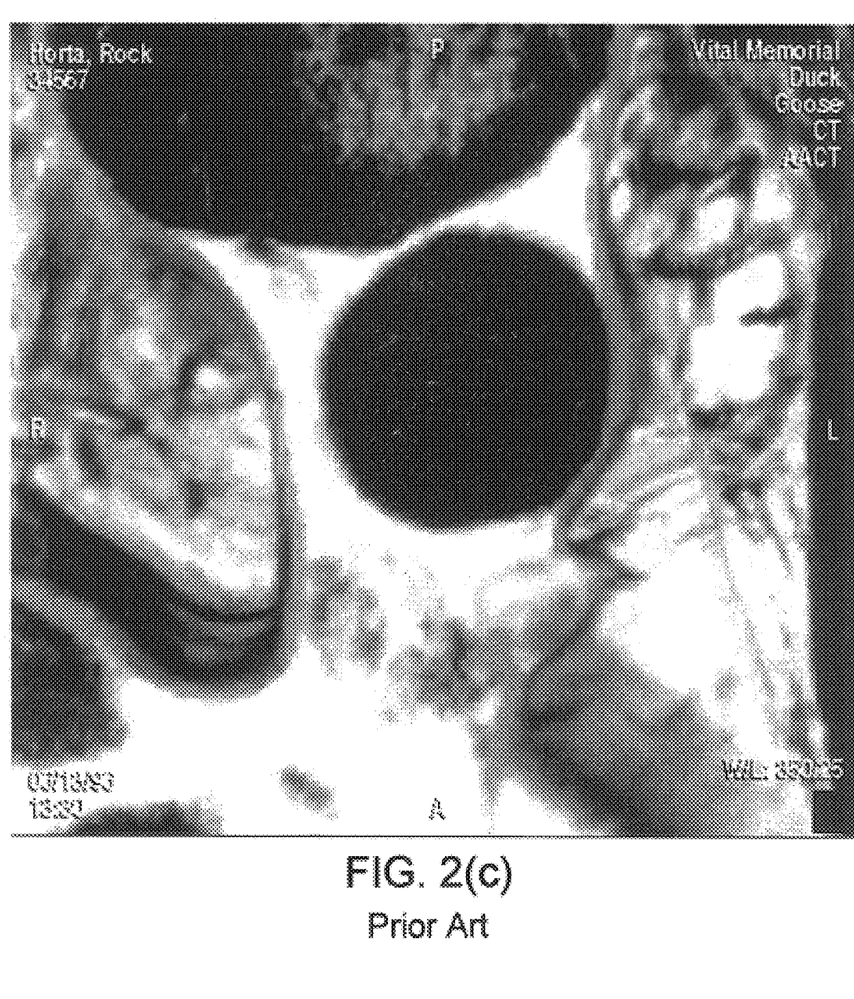

FIG. 2(c) shows a screen shot of a blood vessel (CT data) illuminated in accordance with the prior art. The interior of the blood vessel is blacked out, because the gradients of the voxels comprising the interior wall of the blood vessel point inward, away from the light source (assumed to be pointing from the outside in as well). Conversely, the exterior of the blood vessel is visible, because the gradients of the voxels comprising the exterior wall of the blood vessel point outward, towards the light source.

Figure 3A:
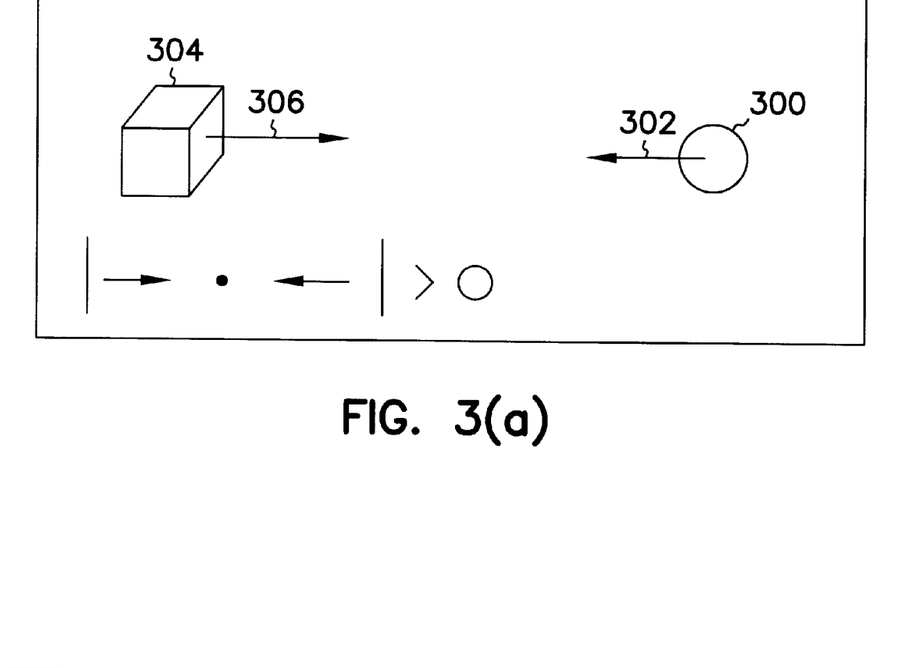
FIGS. 3(a), 3(b) and 3(c) are diagrams showing the manner by which a voxel is lighted in accordance with one embodiment of the invention.
Figure 3B:
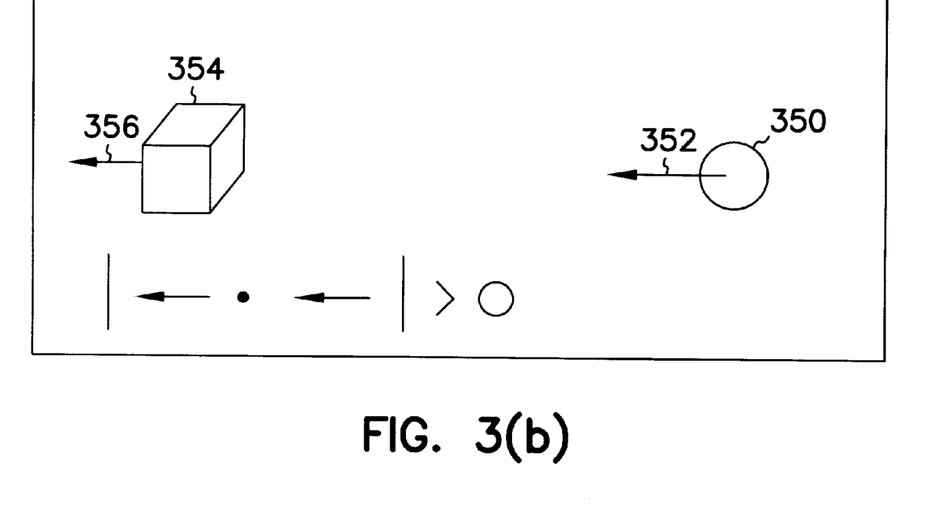

FIGS. 3(a) and 3(b), by comparison, show the manner by which a lighting value is obtained for a voxel in accordance with one embodiment of the invention. Specifically, FIG. 3(a) shows the situation in which a voxel has a surface having a direction pointing towards the light source. Light source 300 has directional vector 302, which is defined as positive. Voxel 304 has gradient 306 pointing in the opposite direction to vector 302, and thus is negative. Voxel 304 is provided with a non-zero lighting value because the absolute dot product of the directional vector of light source 300 and the gradient of voxel 304 is itself non-zero. Thus, as in the prior art, in the situation where a voxel has a surface having a direction pointing towards the light source, the invention provides for lighting of the voxel.

Furthermore, FIG. 3(b) shows the situation in which a voxel has a surface having a direction pointing away from the light source, but is nevertheless still illuminated. Light source 300 has directional vector 352, which is defined as positive. Voxel 354 has gradient 356 pointing in the same direction as vector 352, and thus is also positive. Voxel 354 is provided with a non-zero lighting value because the absolute dot product of the directional vector of light source 350 and the gradient of voxel 354 is itself non-zero. Thus, unlike in the prior art, in the situation where a voxel has a surface having a direction pointing away from the light source, the invention nevertheless provides for lighting of the voxel. Therefore, in situations where such lighting is desirable, the invention provides for an advantage over the prior art.

Figure 3C:
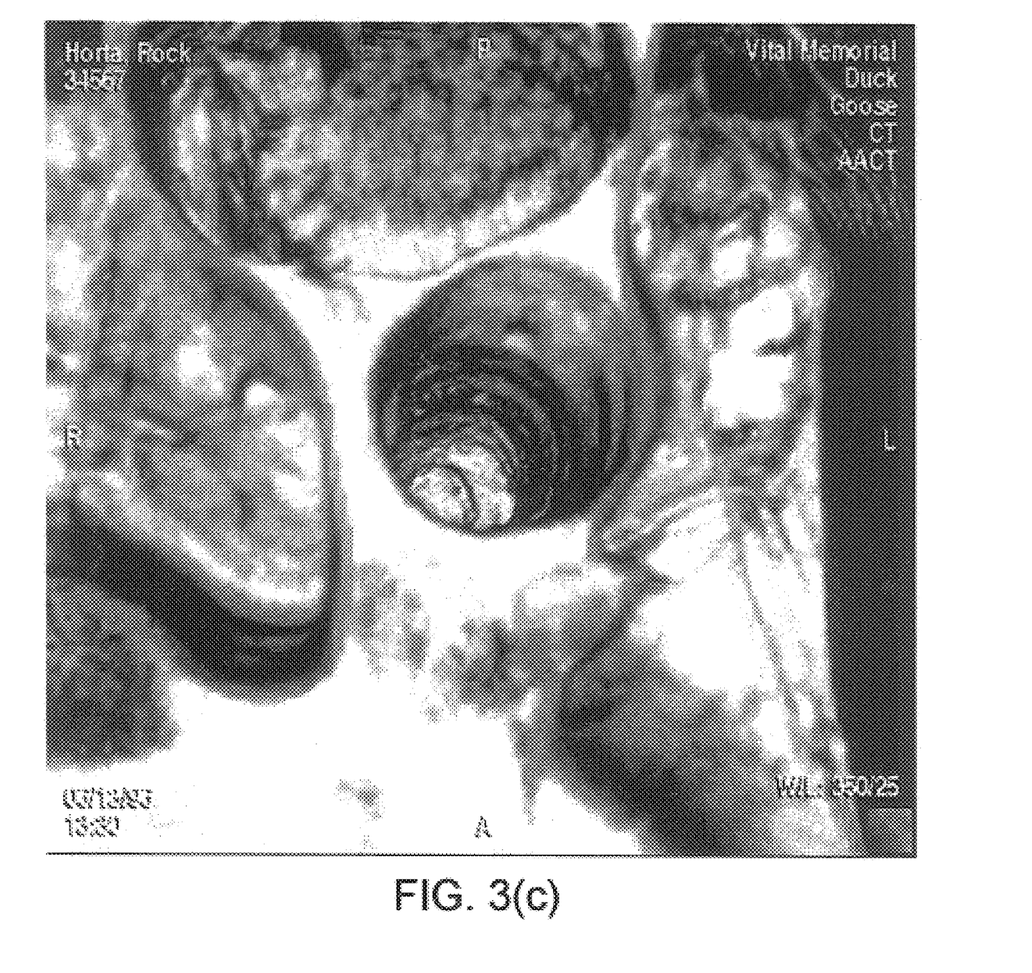

FIG. 3(c) shows a screen shot of a blood vessel (CT data) illuminated in accordance with the invention. The interior of the blood vessel is visible, even thought the gradients of the voxels comprising the interior wall of the blood vessel point inward, away from the light source (assumed to be pointing from the outside in as well). This is because the absolute dot products of the gradients and their corresponding light sources are non-zero. Similarly, the exterior of the blood vessel is visible, because the absolute dot products of the gradients of the voxels comprising the exterior wall of the blood vessel and their corresponding light sources are also non-zero.

In one specific implementation of an embodiment of the invention, the embodiment of the invention builds upon the Phong lighting model known in the art, and the lighting methodology described generally in Drebin, U.S. Pat. No. 4,835,721, which is hereby incorporated by reference. Specifically, those skilled in the art are knowledgeable of the mathematics of lighting as described in page 191 of Jackie Neider, "OpenGL Programming Guide" (1993) (ISBN 0-201-63274-8), the chapter of which entitled "The Mathematics of Lighting" is hereby incorporated by reference. In the prior art, the intensity of light reflected from each voxel is proportional to the dot product of the surface normal or gradient vector and the light direction vector. When the angle between these vectors is greater than ninety degrees, this dot product is negative. In the prior art, this value is clamped to zero (as shown on page 191 of the Neider reference), providing no illumination. In the specific implementation of one embodiment of the invention, conversely, illumination is proportional to the absolute value of the dot product of the surface normal or gradient vector and the light direction vector, such that two-sided lighting is realized.

Computerized Method

In this section of the detailed description, a computerized method according to one embodiment of the invention is shown. The method may be implemented as a computer program executed by a processor of a computer-readable medium of a computer, such as a memory or a nonvolatile storage device. The medium stores first data representing a set of voxel data, each voxel datum having a gradient, desirably either positive or negative, and second data representing a light source having a directional vector. The computer program thus illuminates the voxel data (i.e., provides lighting values for the voxel data), and also desirably displays the voxel data on the display device of the computer.

Figure 4:
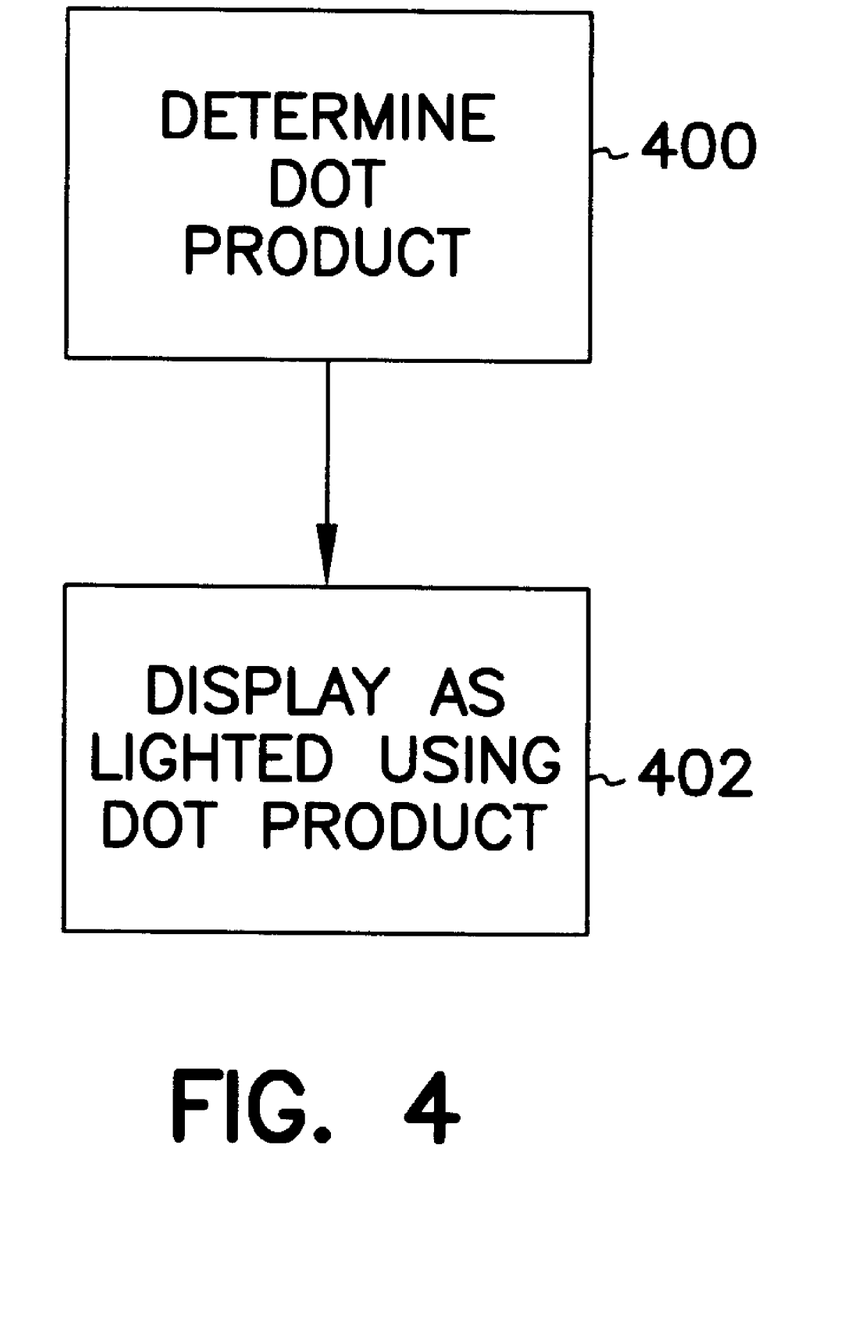
FIG. 4 is a flowchart of a computerized method in accordance with one embodiment of the invention.

Referring then to FIG. 4, a flowchart of a computerized method according to one embodiment of the invention is shown. In step 400, for each voxel within the set of voxel data stored in the computer-readable medium, a dot product of the gradient of the voxel and the directional vector of the light source is calculated. The dot product, as understand but those of ordinary skill within the art, is a mathematical function. Then in step 402, the voxel data may be displayed on the display device of the computer, as a lighting value has been provided for each voxel by step 400. It is noted that other operations may be performed on the voxel data prior to its being amenable to display on the display device; however, these operations, as well as displaying the voxel data on the display device, are understood by those of ordinary skill in the art.

CONCLUSION

Volume rendering lighting using a dot product methodology has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer to assist in displaying a set of voxel data representing an object, the computer comprising:

a processor;

a computer-readable medium storing
   first data representing the set of voxel data, each voxel datum having a gradient selected from the group of gradients essentially consisting of a positive gradient and a negative gradient;
   second data representing a light source having a directional vector; and, a computer program executed by the processor from the medium to display the set of voxel data, including illuminating each voxel datum using an absolute value of a dot product of the gradient of the voxel datum with the directional vector of the light source.

2. The computer of claim 1, wherein the light source is coincident with a viewer of the set of voxel data.

3. The computer of claim 1, wherein the positive gradient corresponds to a direction aligned with the directional vector of the light source.

4. The computer of claim 1, wherein the negative gradient corresponds to a direction opposite to the directional vector of the light source.

5. The computer of claim 1, wherein each gradient corresponds to a direction in which the surface of the voxel datum having the gradient points.

6. The computer of claim 1, wherein illuminating each voxel datum using the absolute value of the dot product of the gradient of the voxel datum with the directional vector of the light source provides for illumination of voxel data having a direction aligned with the directional vector of the light source.

7. A computerized system to assist in displaying a set of voxel data representing an object, each voxel datum with the set having a gradient selected from the group of gradients essentially consisting of a positive gradient and a negative gradient, the system comprising:

a display device; and, means for illuminating each voxel datum of the set of voxel data using an absolute value of a dot product of the gradient of the voxel datum and a light source having a directional vector.

8. The computerized system of claim 7, wherein illuminating each voxel datum using the absolute value of the dot product of the gradient
   of the voxel datum with the directional vector of the light source provides for illumination of voxel data having a direction aligned with the directional vector of the light source.

9. A computerized method to assist in displaying a set of voxel data representing an object on a display device of a computer comprising for each voxel datum within the set:

determining an absolute value of a dot product of a gradient of the voxel datum selected from the group of gradients essentially consisting of a positive gradient and a negative gradient with a directional vector of a light source; and, displaying the voxel datum on the display device as determined by the absolute value of the dot product of the gradient of the voxel datum with the directional vector of the light source.

10. The computerized method of claim 9, wherein illuminating each voxel datum using the absolute value of the dot product of the gradient of the voxel datum with the directional vector of the light source provides for illumination of voxel data having a direction aligned with the directional vector of the light source.

11. A computer-readable medium having computer-executable instructions for performing a method to assist in displaying a set of voxel data representing an object on a display device of a computer, the method comprising for each voxel datum within the set:
  determining an absolute value of a dot product of a gradient of the voxel datum selected from the group of gradients essentially consisting of a positive gradient and a negative gradient with a directional vector of a light source; and,
  displaying the voxel datum on the display device as determined by the absolute value of the dot product of the gradient of the voxel datum with the directional vector of the light source.

12. The computer-readable medium of claim 11, wherein illuminating each voxel datum using the absolute value of the dot product of the gradient of the voxel datum with the directional vector of the light source provides for illumination of voxel data having a direction aligned with the directional vector of the light source.

* * * * *